United States Patent [19]

Brooks et al.

[11] 4,402,377
[45] Sep. 6, 1983

[54] OFF-ROAD VEHICLE HAVING WHEEL SLIP CONTROL

[75] Inventors: James R. Brooks, Wildwood, Ill.; Christopher C. Castelluccio, Oak Creek, Wis.

[73] Assignee: Rexworks Inc., Milwaukee, Wis.

[21] Appl. No.: 298,124

[22] Filed: Aug. 31, 1981

[51] Int. Cl.$^3$ .............................................. B60K 31/00
[52] U.S. Cl. ...................................... 180/197; 60/426; 180/20; 180/242; 180/307; 180/308
[58] Field of Search ................. 180/197, 20, 242, 305, 180/307, 308; 60/420, 426, 459

[56] References Cited

U.S. PATENT DOCUMENTS

| 3,555,968 | 1/1971 | Praddaude | 60/426 |
| 3,889,759 | 6/1975 | Larson | 180/305 |
| 4,236,595 | 12/1980 | Beck et al. | 180/197 |
| 4,310,261 | 1/1982 | Opderbeck | 180/20 |

Primary Examiner—David M. Mitchell
Assistant Examiner—Donn McGiehan
Attorney, Agent, or Firm—George A. Evans, Sr.

[57] ABSTRACT

An off-the-road vehicle has wheel sets of the same or different forms such as rolls or differentially driven wheels with a hydraulic motor and gear reduction drive for each wheel set. An engine driven variable displacement fluid pump is fed by return lines from the motors, and a fluid control system is provided including a valve associated with each motor and a restricted delivery line from each valve to its associated motor, an unrestricted delivery line from each valve to the other motor, and a restricted line connecting the two motors. Each valve is biased toward a first position by a spring and fluid pressure at the associated motor and has ports connecting the pump and restricted line to the associated motor in a first position, each valve being movable toward a second position by pump output pressure and having parts connecting the pump and the other motor through the unrestricted lines in the second position. In the event of a loss of traction by the wheel set driven by the associated motor, each of the lines to and connecting the motors has a restrictor which has been preselected to provide the recovery of traction of each wheel set as required by the slipping characteristics of the respective wheel sets.

6 Claims, 9 Drawing Figures

OFF-ROAD VEHICLE HAVING WHEEL SLIP CONTROL

BACKGROUND OF THE INVENTION

The present invention was developed as a compaction vehicle having an engine driven pump and parallel hydraulic motors respectively driving a forward roll and rear wheel. Normally the parallel connection of the motors allows any differential rotation of the two wheel sets of a vehicle including such as may be due to changes in their effective diameters or loss of traction by one or the other wheel set. The prior art includes flow proportioners which enforce a preselected division of the flow to each wheel set. Some proportioners are such that they must be by-passed to allow limited slipping of the wheel sets such as for high speed travel. Such a by-pass in a compaction roller is shown, for example, in U.S. Pat. No. 3,889,759.

The object of the present invention is to provide an improved limited slip control where, for example, the forward wheel set is a vibrating steel compaction roll and the rear wheel set comprises differentially driven rubber tired wheels and where the tires may have cleats for maximum traction in one direction but not necessarily in the other direction.

A first problem is due to the normal requirement that the tired wheels propel the roller whereas the vibratory roll should not overspeed or underspeed. That is, for example, where the roll is compacting hot asphalt, if the induced roll rotation is too fast or slow relative to ground speed the asphalt is either pulled under the roll or pushed ahead of the roll. This results in an uneven finished surface. The roll, of course, is at the heavier end of the machine. The lighter end is supported by smooth tires which will not mark the asphalt. The second problem develops where the vibratory roller must operate up and down a grade such that additional weight is on the roll and less on the tires or vice versa.

A particular problem develops where the roller is to compact loose soil and the tires are cleated for the required traction which may not be the same in both directions because of the configuration of the cleats. Such a roller may also include a roll having compaction feet so that while the traction of the roll may be substantially more than that of the tires, slipping of the roll in particular will dig out the compacted soil and require adding fill and recompacting.

Another problem develops when the roller is fitted or operated with auxiliary equipment. This may include a forward blade for earth-moving or second compaction roll which is drawn by the roller.

As another matter, the two motors driving the roll and the wheels may be and generally are of entirely different hydraulic characteristics. For example, such a roller may have the following specifications:

| | |
|---|---|
| Gross weight: | 14,000 lbs (5900 KG) |
| Wheelbase: | 104 inches (2565 mm) |
| Drum diameter: | 48 inches (1219 mm) |
| Drum width: | 60 inches (1819 mm) |
| Cleat diameter: | 55-½ inches (1403 mm) |
| Roll motor: | 20.65 cu. in. (524.51 mm$^3$) displ. |
| Roll drive reduction: | 6.8-1 |
| Tires | 17 × 24 |
| Diameter: | 58 inches (1473 mm) |
| Wheel motor: | 5.43 cu. in. (137.92 mm$^3$) displ. |
| Wheel drive reduction: | 24.12-1 |

Separately multiplying pump displacement and gear reduction for the roll and for the wheels as shown above and dividing each product respectively by the radius of the roll and of the wheel will provide a ratio near unity (one). The object of the invention as made was to provide flow and pressure responsive control of the input to each of the motors so that when either wheel set, that is the roll or a wheel, loses its traction, spinning is minimized and additional tractive effort to the other wheel set is immediately effected having due regard for whatever such ratio may be.

Another object was to make the transfer of power from the spinning wheel set separately adjustable so that the different requirements depending upon both the direction of travel and the direction of travel respecting a gradient may be provided as required.

Another object has been to allow the use of flow restrictors so that rate of flow may be sensed but without materially reducing the efficiency of the hydraulic transmission of power from the engine to the wheel sets at any speed.

Another object has been to provide a slip control which does not require any manual control or operator attention.

SUMMARY OF THE INVENTION

A vehicle such as a compaction roller has a forward roll driven by a relatively large displacement, low speed hydraulic motor through a relatively low ratio gear box and rear tired wheels driven by a smaller displacement high speed hydraulic motor through a relatively high ratio gear box and differential. The delivery line to each motor includes a fixed orifice and a restricted connection to the other line. A significant pressure drop across a fixed orifice in one line such as occurs when a wheel set loses traction allows a spring biased valve to divert the flow to the other line such that the flow to the free-wheeling motor is then entirely limited to the flow through the restricted connection. Under normal conditions each valve of the two lines partially diverts the flow to the other line such that the two fixed orifices are progressively by-passed with increasing travel speed to reduce heat generation and power losses. Pump displacement is variable and reversible and the pump and each motor are connected in a closed loop including segments which allow the return flow to by-pass the fixed orifices and the diverter valves. The fixed orifices and restricted connections are of sizes which are each preselected as required having regard to the differences in wheel sets and their overall slipping characteristics.

DESCRIPTION OF THE PREFERRED EMBODIMENT SHOWN IN THE DRAWINGS

Figure 1:
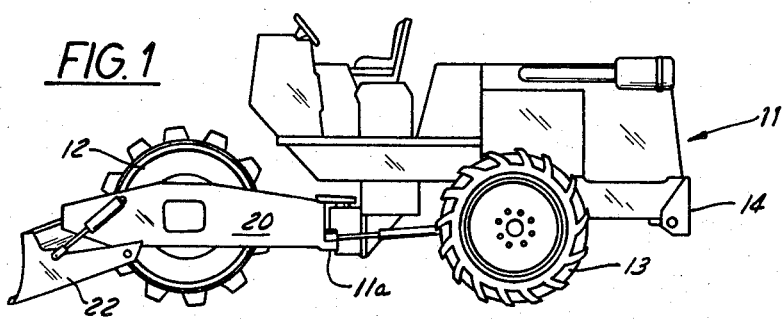
FIG. 1 is a side elevation of a typical vibratory compaction roller.
Figure 3:
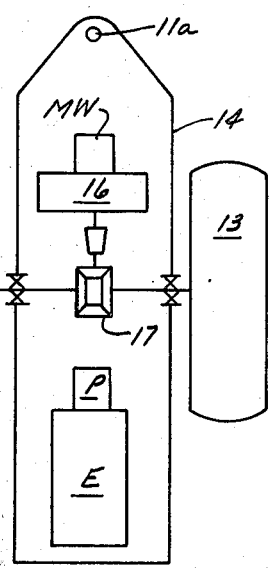
FIG. 3 is a schematic view and cross-section of the engine and transmission driving the rear wheels.

The off-road vehicle shown in FIG. 1 is a vibratory compaction roller 11 which includes the forward roll 12 and the rear tired wheels 13. The main body 14 of the roller is carried by wheels 13 and includes the operator's station. As shown schematically in FIG. 3, the engine E within body 14 drives the variable and reversible displacement pump P. The hydraulic motor MW driven by pump P, drives wheels 13 through the gear reducer 16 and differential 17.

Frame 20 supports roll 12 and optionally carries the scraper blade 22 which may be raised or lowered by the operator as required. Body 14 and frame 20 are connected for articulation about a vertical axis as at 11a for steering.

Figure 2:
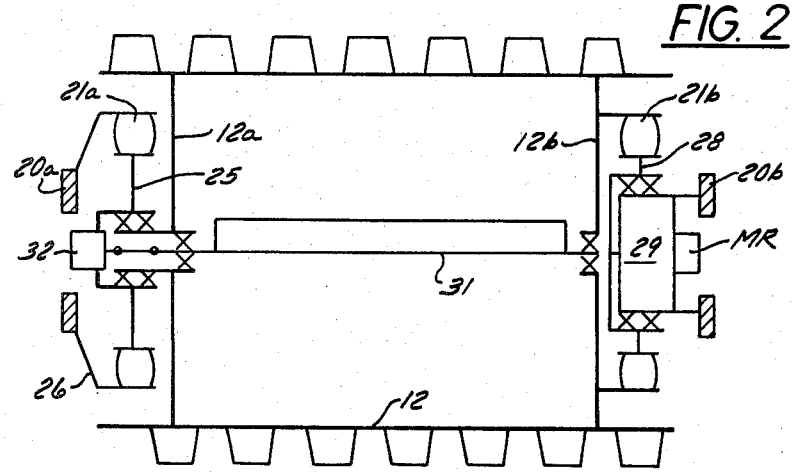
FIG. 2 is a schematic cross-section of the forward roll and drive means.

As shown schematically in FIG. 2, roll 12 is disposed between the side members 20a and 20b of frame 20. Roll 12 comprises a drum having end discs 12a and 12b and resiliently supports the rectangular frame 20 such as by means of the pneumatic tires 21a and 21b. Bearings carried by end disc 12a journally support the inner member 25 fitting within tire 21a and member 26 surrounding tire 21a fixed to side frame member 21a.

End disc 12b supports tire 21b, and the inner member 28 of tire 21b through bearings, supports side frame member 22a. Roll 12 is driven by hydraulic motor MR through the planetary reducer 29. Shaft 31 carrying an eccentric weight is rotatably supported by discs 12a and 12b and is rotated by hydraulic motor 32 carried by inner member 25. The rotation of shaft 31 vibrates roll 12 for the desired compaction effect. Motor 32 is driven by a pump through a suitable hydraulic circuit and control means which need not be further described here.

Figure 4:
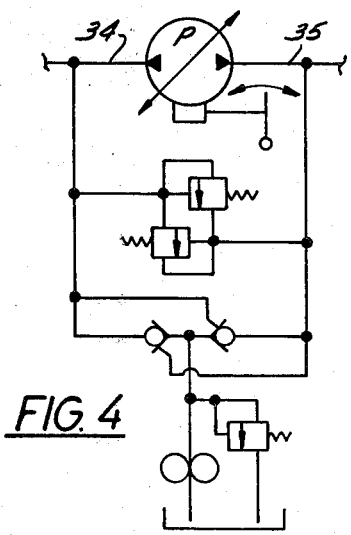
FIG. 4 shows a means for charging and a lever for controlling the engine driven pump.

Pump P and motors MR and MW are connected in closed loops having a suitable and conventional charging system as is shown diagrammatically in FIG. 4. A lever by which the operator may adjust and reverse the displacement of pump P is included in FIG. 4.

Figure 5:
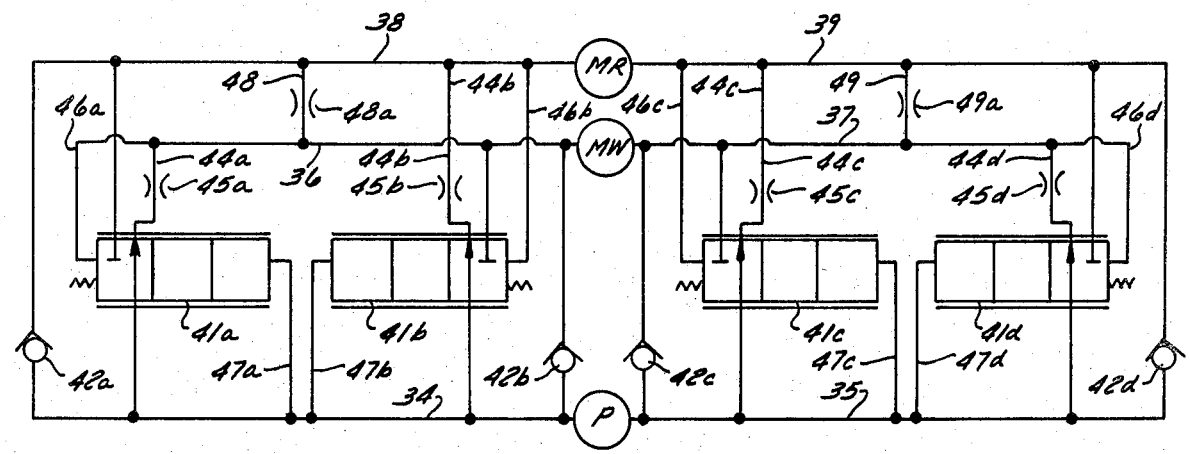
FIG. 5 shows schematically the hydraulic systems which include the engine driven pump and the two motors driving the two wheel sets of the roller of FIGS. 1–3.

The closed loops shown in FIG. 5 include the pump P between main lines 34 and 35, the hydraulic motor MW between main lines 36 and 37 and hydraulic motor MR between main lines 38 and 39. Line 34 includes branches connected to the valves 41a and 41b and to the pressure operated return check valves 42a and 42b. Line 35 includes branches connected to the valves 41c and 41d and the pressure operated return check valves 42c and 42d. Line 36 includes branches connected to valves 41b and 42b; line 37 includes branches connected to valves 41c and 42c; line 38 includes branches connected to valve 41a and 42a; line 39 includes branches connected to valves 41d and 42d. The restricted lines 44a and 44b connect valves 41a and 41b with lines 36 and 38; the restricted lines 44c and 44d connect valves 41c and 41d with lines 39 and 37; the restricted lines 44a through 44d include the restrictors 45a through 45d, all respectively. As indicated, each of valves 41a through 41d is an infinite positioning pilot operated spring biased three-way valve of two positions (an intermediate position also being shown). For the operation of the valves as will be described, pilot lines 46a and 47a of valve 41a are connected to lines 36 and 34, pilot lines 46b and 47b of valve 41b are connected to lines 38 and 34, pilot lines 46c and 47c of valve 41c are connected to lines 39 and 35 and pilot lines 46d and 47d of valve 41d are connected to lines 37 and 35, all respectively. The operation of check valves 42a through 42d will be described hereinafter. Restricted line 48 with restrictor 48a connects lines 36 and 38 and restricted line 49 with restrictor 49a connects lines 37 and 39.

Figure 6:
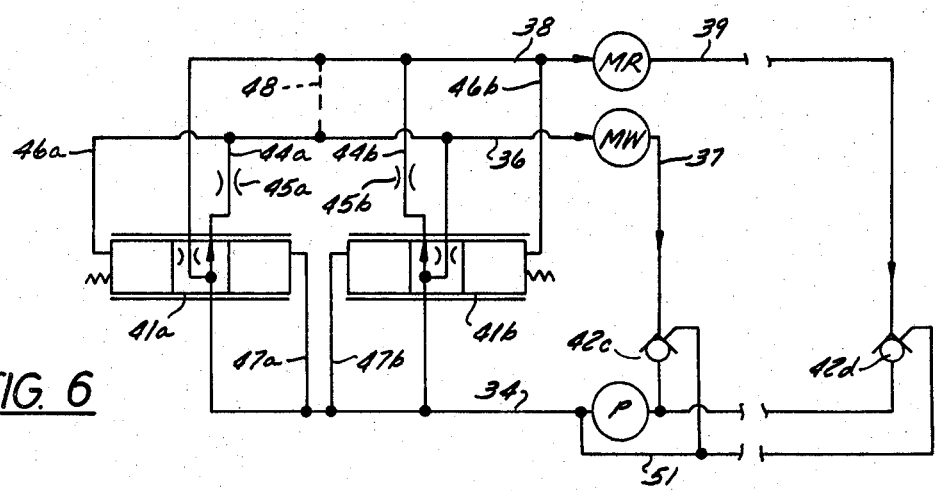
FIG. 6 shows the functioning portions of the circuits in one direction of operation at high speed.
Figure 7:
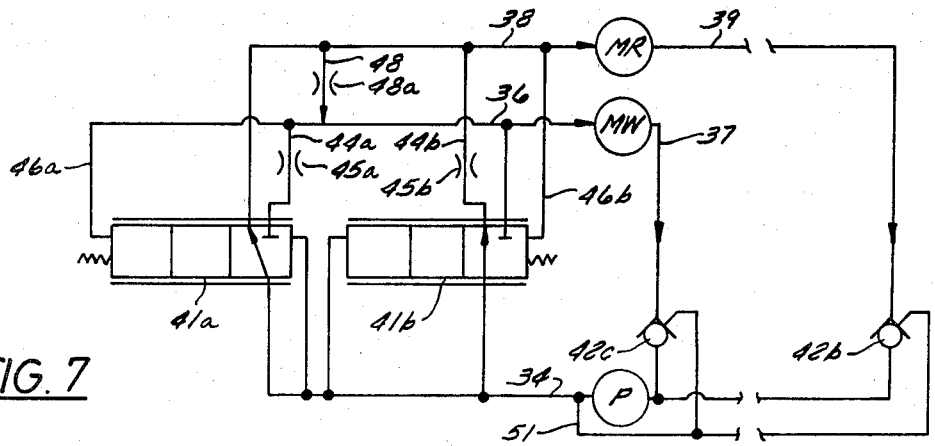
FIG. 7 shows the functioning portions of the circuits when one of the wheel sets has lost traction.

In the operation of roller 11 in one direction which will be referred to as the forward direction, lines 34, 36 and 38 are the delivery lines, lines 39, 37 and 35 are the return lines. The flow at nominal rates passes through restrictors 45a and 45b and/or is by-passed as will be described. The return flow by-passes restrictors 45c and 45d through valves 42c and 42d which are opened by pump output pressure through the pilot line 51 from line 34 and having branches to valves 42c and 42d (as shown in FIGS. 6 and 7. The corresponding pilot lines to valves 42a and 42b are omitted from the Figures.)

The movement of valve 41a from position 1 as shown in FIG. 5 to position 2 as shown in FIG. 7, and intermediate positions including as shown in FIG. 6, is effected by the pressure in line 47a and line 34 and to the extent that such pressure is greater than the combined force of the valve spring and the pressure in line 46a and line 36. That is, valve 41a is responsive to the pressure loss across restrictor 45a. Valve 41b is similarly responsive to the pressure loss across restrictor 45b. The speeds of roller 11 at which such valve movements occur depend on the sizes of the restrictors. At lowest speeds, valves 41a and 41b remain in position 1 as shown in FIG. 5 and any slight differences in the amount of flow required to drive motors MR and MW at the same ground speeds is allowed to pass from line 36 to line 38, or the reverse, through restrictor 48a.

With increasing speed of roller 11 under normal conditions, the increasing pressure drop across both restrictors 45a and 45b due to increased flow causes both valves 41a and 41b to allow some and progressively more flow to by-pass restrictors 45a and 45b. This is important in that power losses through heat generation are held to a minimum and in turn allows restrictors 45a and 45b to be sized so that they will be effective to limit slipping of roll 12 or wheels 13. It should be noted, however, that valves 41a and 41b together will not be fully moved to their position 2 because there is then no pressure drop (except due to line losses) such as is required to effect movement fully to position 2.

Under normal travel conditions, valves 41a and 41b will move to intermediate positions where the flows from line 34 to line 38 through valve 41a and from line 34 to line 36 through valve 41b are restricted as indicated in FIG. 6 to the extent that a pressure loss is effected as is required to so position the valves. However, their positioning and the flows therethrough may vary relatively to allow for normal differences in speeds between roll 12 and wheels 13. The line 48 which includes restrictor 48a is then not significant and is shown in broken lines in FIG. 6.

In the event that a wheel 13 loses traction and overspeeds, motor MW will present a greatly reduced resistance to flow from line 36 to line 37 and the considerable pressure drop across restrictor 45a and reduced pressure in pilot line 46a will cause valve 41a to move to position 2 as shown in FIG. 7. This will direct full flow from line 34 to line 38 and toward motor MR driving roll 12 which has not lost traction. The pressure in line 38 and pilot line 46b will then essentially equal that in line 34 such that the spring of valve 41b will move the valve to position 1. The flow to motor MW is then through restrictor 48a and is limited as desired by its selected size. Similarly, if roll 12 loses traction, valve 41a will move to position 1 and valve 41b will move to position 2.

When pump displacement is reversed for travel in the reverse direction, lines 35, 37 and 39 are the delivery lines, valves 41c and 41d are operable and the slip control is similarly determined by restrictors 45c, 45d and 49b. Return flow is then from lines 38 and 36 to line 34 through the pressure controlled check valves 42a and 42b.

Figure 8:
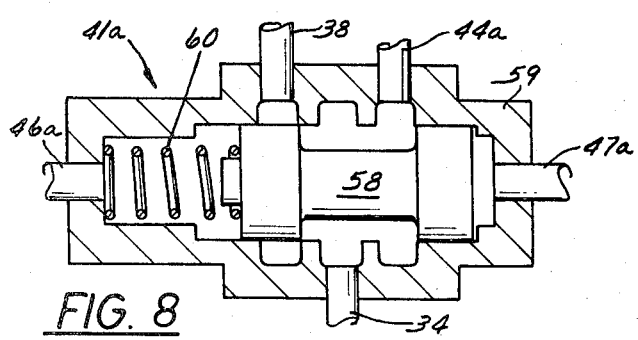
FIG. 8 shows in cross-section the elements of one of the four valves of FIG. 5. The valve shown is typical and representative of the valves required for the present invention.

Valves 41a–41d may be of any suitable construction. The valve 41a shown in FIG. 8 is illustrative only. It includes the spool 58 which is movable in the bore of valve body 59. Line 46a is connected to one end of the bore and line 47a to the other end of the bore to move spool 58 against spring 60 so that line 34 is connected with line 44a in position 1 as shown and with line 38 in position 2, not shown.

Figure 9:
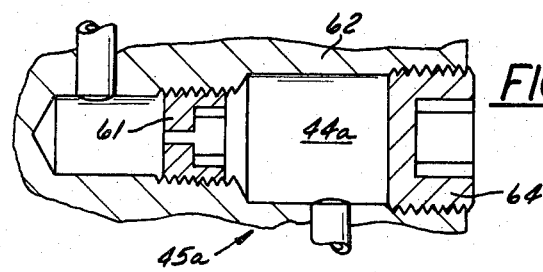
FIG. 9 shows in cross-section one of the flow restrictors. In particular the flow restrictor element with the drilled orifice of a selected size may be replaced with another of another size.

A preferred construction of a restrictor is shown in FIG. 9. It comprises the threaded plug 61 having a drilled passage of a selected size. Plug 61 is located in the stepped bore of body 62 which forms a part of line 44a, for example. The larger threaded outer plug 64 closes the bore of body 62 and is removable for access to and replacement of plug 61 as may be required.

It is important to the present invention that the size of each of restrictors 45a through 45d, 48a and 48b may each be selected according to the operating characteristics of the roller 11 or other off-road vehicle under various conditions of forward and rearward travel and having regard to the different hydraulic characteristics where, as may be the case, motors MR and MW are of entirely different designs, the gear reduction units are dissimilar, the wheel sets are different and may have different slipping characteristics in the forward and rearward directions and at different gradients because of weight distribution.

As examples, the tires as shown in FIG. 1 have cleats of a pattern such that they have significantly better traction in the forward direction. However, in ascending a grade backwards (wheels preceding), the wheels may have very little traction compared to that of roll 12. Also generally, the roll, where equipped with cleats will have considerably better traction. The scraper blade 22 when depressed may have different effects according to its intended uses.

As may be noted, the valves 41a and 41b are responsive to the overspeeding of roll 12 relative to wheels 13 or vice versa, to the degree or as determined by the relative sizes of the drilled passages forming restrictors 45a and 45b. Then, after such response (one such response being shown in FIG. 7) the rotational speed of the wheel set which is without traction (roll 12 or wheels 13) is determined by the output pressure of pump P in line 34 and the size of the drilled passage forming restrictor 48a. Generally here the output pressure may be the maximum working pressure as allowed by either of the pressure relief valves shown in FIG. 4 depending upon the direction of travel. When roller 11 is operated in the reverse direction, valves 41c and 41d, and the restrictors 45c, 45d and 49a are similarly operative. In the embodiment of the invention shown and described, the diameters of the drilled passages forming restrictors 45a through 45d are between 0.086 inches (2.25 mm) and 0.093 inches (2.36 mm). The sizes of the drilled passages forming restrictors 48a and 49a are necessarily in the orer of 0.70 inches (1.79 mm) so that the roll 12 or wheels 13 which have full traction will also have the full torque which the pump and hydraulic system can provide.

With such restrictors, when roll 12 is stalled or nearly so and the wheels 13 have virtually no traction, the wheels will rotate at most in the order of 30 rpm. When motor MR is able to drive roll 12 and the roller although wheels 13 have lost traction, the rotational speed of wheels 13 is limited such as to 6% to 10% over the rotational speed of the roll. Similar control of roll overspeeding is also provided and similar controls are provided in the opposite direction as desired and as described.

The specifications of a roller as described and given in the BACKGROUND OF THE INVENTION are illustrative also of a typical case in which the displacements of the two pumps in terms of a given ground travel distance can be matched by the selections of the pumps and reduction gearing employed. However, such selections are limited to the sizes available and the degree of matching allowed in practice is therefore limited. The present invention completes the desired matching in two respects. At low speeds such as up to 2 mph (0.894 m/s) for example, restrictors 45a and 45b provide such matching in one direction and restrictors 45c and 45d are sized to do so in the other direction. Above such speeds valves 41a and 41b at intermediate positions do so in one direction and valves 41c and 41d do so in the other direction.

We claim:

1. An off-the-road vehicle having wheel sets of the same or different forms such as rolls or differentially driven wheels, a hydraulic motor and gear reduction drive for each wheel set, an engine driven variable displacement fluid pump, return lines from the motors to the pump, and a fluid control system which includes a valve associated with each motor and a restricted delivery line from each valve to the associated motor an unrestricted delivery line from each valve to the other motor and a restricted line connecting the two motors, each valve being biased toward a first position by a spring and fluid pressure at the associated motor and having ports connecting the pump and restricted line to the associated motor in such first position, each valve being movable toward a second position by pump output pressure and having ports connecting the pump and the other motor through the unrestricted lines in such second position such as in the event of a loss of traction by the wheel set driven by the associated motor, each of said lines to and connecting said motors having a restrictor which has been preselected to provide the recovery of traction of each wheel set as required by the slipping characteristics of the respective wheel sets.

2. The vehicle of claim 1 wherein the pump is also of reversible displacement capability and the pump and each motor are connected in closed loops, each loop including the described fluid control system, a normally closed return line associated with each loop, and means operated by the pump output pressure in the loop to open such return line, the restrictors of each loop being preselected to provide the recovery of traction of either wheel set as required by its slipping characteristics in the direction of travel determined by pump displacement.

3. The vehicle of claims 1 or 2 wherein each valve of the control system also has an intermediate position providing connection of the pump and the restricted delivery line to the associated motor and a nominally restricted connection of the pump and the unrestricted delivery line to the other motor such as for maximum operating speeds under normal conditions.

4. A compaction roller having wheel sets in the form of rolls or differentially driven wheels, a hydraulic motor and gear reduction drive for each wheel set, an engine driven variable displacement fluid pump, and return lines from both motors to the pump; a fluid control system which includes a valve associated with each motor and a restricted delivery line from each valve to the associated motor, an unrestricted delivery line from each valve to the other motor and a restricted line connecting the two motors, each valve being biased toward a first position by a spring and fluid pressure at the associated motor and having ports connecting the pump and restricted line to the associated motor in such first position, each valve being movable toward a second position by pump output pressure and having ports connecting the pump and the other motor through the unrestricted lines in such second position such as in the event of a loss of traction by the wheel set driven by the associated motor, each of said lines to and connecting said motors having a restrictor which has been preselected to provide the recovery of traction of each wheel set as required by the slipping characteristics of the respective wheel sets.

5. The compaction roller of claim 4 wherein the pump is also of reversible displacement capability and the pump and each motor are connected in closed loops, each loop including the described fluid control system, a normally closed return line associated with each loop, and means operated by the pump output pressure in the loop to open such return line, the restrictors of each loop being preselected to provide the recovery of traction of either wheel set as required by its slipping characteristics in the direction of travel determined by pump displacement.

6. The compaction roller of claims 4 or 5, the control system wherein each valve also has an intermediate position providing connection of the pump and the restricted delivery line to the associated motor and a nominally restricted connection of the pump and the unrestricted delivery line to the other motor such as for maximum operating speeds under normal conditions.

* * * * *